(12) United States Patent
Cryan (10) Patent No.: US 12,431,682 B2
(45) Date of Patent: Sep. 30, 2025

(54) ERBIUM DOPED FIBER ISOLATOR COMPONENTS

(71) Applicant: ACACIA TECHNOLOGY, INC., San Jose, CA (US)

(72) Inventor: Colm V. Cryan, Newport (IE)

(*) Notice: Subject to any disclaimer, the term of this patent is extended or adjusted under 35 U.S.C. 154(b) by 1055 days.

(21) Appl. No.: 17/186,638

(22) Filed: Feb. 26, 2021

(65) Prior Publication Data

US 2022/0069535 A1 Mar. 3, 2022

Related U.S. Application Data

(60) Provisional application No. 63/074,137, filed on Sep. 3, 2020.

(51) Int. Cl.
*H01S 3/00* (2006.01)
*H01S 3/067* (2006.01)
*H01S 3/16* (2006.01)

(52) U.S. Cl.
CPC ........ *H01S 3/0064* (2013.01); *H01S 3/06716* (2013.01); *H01S 3/06754* (2013.01); *H01S 3/1608* (2013.01)

(58) Field of Classification Search
None
See application file for complete search history.

(56) References Cited

U.S. PATENT DOCUMENTS

| 6,353,497 | B1* | 3/2002 | Zhang | H01S 3/10023 |
| | | | | 359/341.1 |
| 7,440,163 | B1* | 10/2008 | Zhou | G02B 6/4246 |
| | | | | 359/333 |
| 2002/0063950 | A1 | 5/2002 | Lee et al. | |
| 2003/0068119 | A1 | 4/2003 | Xie et al. | |
| 2004/0032644 | A1 | 2/2004 | Griffin | |
| 2005/0031280 | A1* | 2/2005 | Izoe | G02B 6/105 |
| | | | | 385/123 |
| 2009/0257116 | A1* | 10/2009 | Sweeney | H01S 3/06758 |
| | | | | 359/341.5 |
| 2018/0254599 | A1* | 9/2018 | Zhou | H01S 3/094011 |
| 2019/0245316 | A1* | 8/2019 | Zheng | H01S 3/1302 |
| 2021/0281036 | A1* | 9/2021 | Delavaux | H01S 3/094007 |
| 2022/0385023 | A1* | 12/2022 | Chen | H01S 3/1301 |

OTHER PUBLICATIONS

Gong-Ru Lin et al.; "Improving the Quantum Efficiency of Erbium-Doped Fiber Laser by Using a Low-Loss Tipped Fiber Splicing Process"; IEEE Photonics Technology Letters; vol. 15; No. 9; (2003); pp. 1201-1203.

(Continued)

*Primary Examiner* — Eric L Bolda
(74) *Attorney, Agent, or Firm* — Patterson + Sheridan, LLP (57) ABSTRACT

A system including an erbium doped fiber amplifier (EDFA), comprising a length of erbium doped fiber having a first end and a second end, an isolator wavelength division multiplexer (IWDM) comprising an output optically connected at an optical connection with the first end of the erbium doped fiber, wherein the optical connection with the first end of the erbium doped fiber is continuous between the IWDM and the first end of the erbium doped fiber, and an isolator comprising an input optically connected at an optical connection with the second end of the erbium doped fiber.

18 Claims, 7 Drawing Sheets

(56) References Cited

OTHER PUBLICATIONS

Shien-Kuei Liaw et al.; "Low noise-figure miniature erbium-doped fibre amplifier using uncooled pump laser"; Optical and Quantum Electronics; vol. 38; (2006); pp. 625-631.
Kimio Shigihara et al.; "Modal field transforming fiber between dissimiliar waveguides"; Journal of Applied Physics; vol. 60; No. 12; (1986); pp. 4293-4296.
PCT International Search Report and PCT Written Opinion for PCT International Patent Application No. PCT/US2021/046831; date of mailing Dec. 21, 2021; (15 pages).

* cited by examiner

ERBIUM DOPED FIBER ISOLATOR COMPONENTS

CROSS-REFERENCE TO RELATED APPLICATIONS

The present application claims priority to U.S. provisional application Ser. No. 63/074,137, filed on Sep. 3, 2020, entitled "Erbium Doped Fiber Isolator," and which is incorporated herein by reference in its entirety.

FIELD

This disclosure relates generally to the field of integrated circuits.

BACKGROUND

Contemporary optical communications and other photonic systems make extensive use of photonic components that are advantageously mass-produced in various configurations for various purposes.

SUMMARY

In part, in one aspect, the disclosure relates to a system, comprising an erbium doped fiber amplifier (EDFA), comprising a length of erbium doped fiber having a first end and a second end, an isolator wavelength division multiplexer (IWDM) comprising an output optically connected at an optical connection with the first end of the erbium doped fiber, wherein the optical connection with the first end of the erbium doped fiber is continuous between the IWDM and the first end of the erbium doped fiber, and an isolator comprising an input optically connected at an optical connection with the second end of the erbium doped fiber.

In one embodiment, the system further comprises where optical connection with the first end of the erbium doped fiber is via an optical fiber optically connected with the IWDM. In one embodiment, the system further comprises where a first diameter of the optical fiber and a second diameter of the erbium doped fiber is equal. In one embodiment, the system further comprises where the optical connection with the first end of the erbium doped fiber is at the IWDM, wherein the erbium doped fiber is directly connected to the IWDM. In one embodiment, the system further comprises where the optical connection with the second end of the erbium doped fiber is continuous between the second end of the erbium doped fiber and the isolator. In one embodiment, the system further comprises where the optical connection with the second end of the erbium doped fiber is via an optical fiber optically connected with the isolator. In one embodiment, the system further comprises where a first diameter of the optical fiber and a second diameter of the erbium doped fiber is equal.

In part, in one aspect, the disclosure relates to a system, comprising a length of optical fiber having a first end and a second end, an isolator wavelength division multiplexer (IWDM) having an output pigtail, where the IWDM is optically connected to the length of optical fiber via the output pigtail, wherein a cladding of the output pigtail has a first diameter and a cladding of the length of optical fiber has a second diameter, wherein the first diameter and the second diameter are equal.

In one embodiment, the system further comprises where the length of optical fiber is erbium doped fiber. In one embodiment, the system further comprises where the output pigtail of the IWDM and the length of optical fiber are spliced together. In one embodiment, the system further comprises where the IWDM comprises: an isolator core optically connected to an input pigtail of the IWDM; and a wavelength division multiplexer optically connected to a pump via a pump pigtail and optically connected to the output pigtail. In one embodiment, the system further comprises an optical pump having an output pigtail and wherein the IWDM, having a pump pigtail, is optically connected to the optical pump via the pump pigtail of the IWDM.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components, and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

In various embodiments, the disclosure may relate to a design and implementation of optical components (e.g., isolator wavelength division multiplexer (IWDM) and/or isolator) to amplify the power in a signal travelling in an optical fiber 'pigtail'. Generally, an amplification may be provided by an erbium doped fiber amplifier (EDFA) core. Typically, in the manufacture of an EDFA core, parameters such as small size, low noise figure (NF), low-cost, low re-splice requirement and/or increased reliability, are desirable. Typically, an EDFA core is assembled using components such as IWDMs, EDF and isolators. Generally, IWDMs have three fiber pigtails; an input pigtail through which the optical signal to be amplified enters the IWDM; a pump pigtail through which the optical power that is used to amplify the input signal enters the IWDM and an output pigtail where both the input signal and pump power exit the IWDM. Typically, fiber in an IWDM is selected to suit a system that delivers the signal to an EDFA core and the fibers in the IWDM will have similar properties (e.g., cladding diameter, single mode at appropriate wavelengths and non-EDF). Generally, fiber in an EDF is selected with a concentration of Erbium dopant, and small diameter to facilitate tight bends and small size. Conventionally, an isolator fiber is made with an output fiber that suits a system that is receiving an amplified signal and an input fiber will be the same, which may not match well with an EDF and hence causes signal loss.

Typically, IWDMs are designed such that the input, pump and output pigtails all have substantially the same properties (e.g., same cladding diameter, single mode fibers (SMF) at the appropriate wavelengths (e.g. pump and/or signal wavelength), and non-erbium doped fibers (non-EDF). Conventionally, EDFA cores have erbium doped fiber (EDF) where pump power is converted to signal power thereby amplifying the input signal relative to what was received at the input pigtail of the IWDM. Typically, a signal optical power to be amplified is connected to an input pigtail of an EDFA core, may travel through the IWDM, erbium doped fiber (EDF), and isolator before exiting the EDFA core via an output pigtail. Generally, an increase in signal power is achieved by converting pump power, which may be provided to the EDFA core by means of a pump pigtail, to signal power. Traditionally, an IWDM combines a signal power and a pump power into a single output pigtail.

In many embodiments, Applicants realize that improved performance and reduction in size of an EDFA core may be possible through the modification of components used to assemble an EDFA core (e.g., the IWDM, EDF and/or isolator) such that differences between two fibers being spliced may be reduced and/or a length of fiber used to manufacture the EDFA core may be reduced and/or the number of splices may be reduced. In various embodiments, Applicants realized that individual components used to assemble the EDFA core may be modified to create hybrid components where input and output pigtails are different, and where differences may be tailored to facilitate a subsequent splicing of pigtails. For example, in some embodiments, a hybrid IWDM may have a 125 µm cladding diameter input pigtail and an 80 µm cladding diameters output pigtail and/or a 9.0 µm MFD input pigtail and a 6 µm MFD output pigtail and/or non-EDF input pigtail and a EDF output pigtail. In another example, a hybrid isolator may have an 80 µm cladding diameter input pigtail and a 125 µm cladding diameter output pigtail and/or a 6.0 µm MFD input pigtail and a 9 µm MFD output pigtail and/or EDF input pigtail and a non-EDF output pigtail.

In many embodiments, an EDF may be provided on a spool and/or routed within the package containing an EDFA core. In certain embodiments, an EDF used in an EDFA core may be a length of uniform diameter erbium doped fiber. In some embodiments, an EDF may convert a pump power to a signal power. In most embodiments, an isolator may prevent a signal and/or pump power from travelling in a reverse direction through an EDFA core. In various embodiments, isolators may have two fiber pigtails; an input pigtail through which the amplified optical signal enters the isolator and an output pigtail where the optical signal exits the isolator. In various embodiments, optical power may flow from the input pigtail to the output pigtail of an isolator. In certain embodiments, optical power may not flow from the output pigtail to the input pigtail of an isolator. In most embodiments, isolators may be designed such that the input, and output pigtails, have the same properties (e.g., same cladding diameter, single mode fibers (SMF) at the appropriate wavelengths and non-erbium doped fibers (non-EDF).) In various embodiments, the properties of an EDF (e.g., cladding diameter, mode field diameter (MFD), erbium doped concentration and/or number of modes supported) may differ from the fiber used on the IWDM pigtails and/or the isolator pigtails.

In certain embodiments, in the packaging of an EDFA core for use in a system, it may be desirable that the components take up as little space as possible (e.g., the amount of fiber used is minimized, and/or the fiber can be bent into tight radius of curvature, and/or the diameter of the fiber is small.) In some embodiments, an EDF may be selected to have a smaller cladding diameter to reduce a size of a fiber coil in an EDFA core to facilitate a low bend radius of curvature. In addition, in some embodiments, an EDF may have erbium doped in a core and/or cladding region and may support multiple modes at a pump wavelength (e.g., 980 nm and/or 1480 nm.).

In various embodiments, an EDFA core may include an IWDM, EDF, and an isolator. In other embodiments, an EDFA core may include a second IWDM instead of an isolator. In other embodiments, an IWDM's sub-components (e.g., isolator and wavelength division multiplexer (WDM)) may be provided as separate components. In certain embodiments, an EDFA core may include a different arrangement and/or selection of components. In some embodiments, an IWDM may combine optical power from a signal to be amplified that enters through an IWDM input pigtail and multiplexed with pump optical power. In certain embodiments, a non-EDF pigtail may be joined to an 'EDF' pigtail by means of a 'splice.' In various embodiments, a 'splice' may reduce the amount of optical power transmitted through a 'splice' by 5-10% of the transmitted optical power. In some embodiments, Pump power in an EDF may be transferred to an input signal which may be amplified and exit an EDFA core with more power than at an IWDM's input pigtail. In certain embodiments, an EDF may be spliced to a non-EDF pigtail on the isolator. In many embodiments, an amplified signal from an EDFA core may pass through a series of components, such as a tunable optical filter (TOF) that may remove noise power outside a signal wavelength range, a variable optical attenuator (VOA) that may control a power level of an amplified signal, and a PIN-tap that may measure a power level of an amplified signal. In various embodiments, components located outside an EDFA core may use pigtails that are different than an EDF.

In various embodiments, an assembly of an EDFA core may require splicing an IWDM's pump pigtail to a pump source, splicing the IWDM's output pigtail to an EDF, and splicing an EDF to an input pigtail of an isolator. Often, a design of optical components requires alignment and fusion of pigtails that have different physical properties (e.g., different cladding diameters, and/or different MFDs and/or different erbium doping concentrations.) For example, in some embodiments, a large cladding diameter pigtail may need to be spliced to a small cladding diameter pigtail and/or a non-EDF pigtail to an EDF pigtail and/or splice a multimode fiber (MMF) to a singlemode fiber (SMF). Traditionally, pigtails are spliced together because it is a cheap option that uses standardized equipment (pigtail strippers, cleavers and/or splicers) and parts (e.g., splice protectors and/or re-coaters) and methods. Generally, EDFA cores are manufactured with a small tolerance for failures and/or damage to components. Often, manufacturers include a limited amount of extra fiber within an EDFA core for when splicing is unsuccessful (e.g., high loss) and/or fiber within the EDFA is damaged. In most embodiments, extra fiber within a device may allow re-splicing. Typically, splicing a large cladding diameter pigtail to a small cladding diameter pigtail is an error prone process, as is splicing of non-EDF to EDF. Generally, as a result of the error prone process, components can be damaged or fail (e.g., weak splice, increased optical power loss, and/or failed components within the EDFA core). Typically, a probability of failure increases when pigtails being spliced together are different (e.g., different cladding diameters and/or different MFD and/or non-EDF and EDF.) In addition, traditionally, there is a limited ability and/or limited number of times that improper splices can be broken and re-spliced.

In various embodiments, different fiber types may be combined in different arrangements to create hybrid components with pigtails optimized to couple EDF with non-EDF fiber. In certain embodiments, hybrid components with different pigtails may include, but is not limited to, multimode fibers (MMF) or single mode fibers (SMF) and/or polarization maintaining fibers (PMF), and/or different cladding diameter pigtails such as 80 μm and 125 μm cladding diameter pigtails, different mode field diameter (MFD) fibers such as 6 μm and 9 μm MFD, and/or non-EDF and EDF.

In many embodiments, performance of an EDFA core may be improved by modifying optical pigtails of components to form hybrid versions of the components (e.g., IWDM and/or isolator) from which it may be constructed. In various embodiments, EDFA core components may be constructed as 'hybrid' components where more than one type of fiber is used. In certain embodiments, each component may be constructed from two or more types of fiber. For example, in some embodiments, an IWDM may have a 125 μm SMF input pigtail, an 80 μm MMF pump pigtail and an 80 μm EDF output pigtail. In other embodiments, an isolator may have an 80 μm EDF input pigtail and a 125 μm SMF output pigtail. In some embodiments, a size of an EDFA core may be reduced through elimination of a non-EDF pigtail and a splice. In certain embodiments, a noise function (NF) of an EDFA core may be improved by reducing signal power loss within the EDFA core. In some embodiments, a NF may be a measure of degradation of the optical signal-to-noise ratio (OSNR) which may be caused by components in an optical path of the EDFA core and/or fiber used to form pigtails and/or splices used to join the pigtails. In various embodiments, signal power loss and pump power loss may be reduced in the EDFA core by modifying one or more of the components used to manufacture the EDFA core, such as: reduction in the cladding diameter difference between spliced pigtails, elimination of one or more splices, elimination of a mode field diameter (MFD) mismatch between spliced pigtails and/or reducing the length of fiber in the EDFA core. In some embodiments, when splicing two optical pigtails together, matching cladding diameters may facilitate splicing ends of the two pigtails. Typically, if pigtails being spliced have a cladding diameter mismatch then cores of the pigtails are more difficult to align, resulting in increased optical power loss.

In certain embodiments, reducing optical power loss of the signal to be amplified, before it enters the EDF, may improve the NF of an EDFA core. In many embodiments, a cost of an EDFA core may be reduced by eliminating one or more splices, reducing splice loss, improving splice yield, and/or reducing the amount of fiber required to manufacture the EDFA core. In some embodiments, reducing a length of fiber and/or splices within an EDFA core may improve its reliability and may increase the space available for fiber protection and/or other components. In some embodiments, removing a single splice may reduce a size of an EDFA core by eliminating one or more meters of fiber and a splice protector. In some embodiments, two splices may be removed from an EDFA core such that an IWDM output pigtail and isolator input pigtail may be fabricated with a single, non-spliced, length of EDF. In various embodiments, removing a splice or reducing splice loss, may reduce optical power loss by 5-10%, which may be equivalent to 0.2 to 0.5 dB improvement in signal power and NF.

Figure 1:
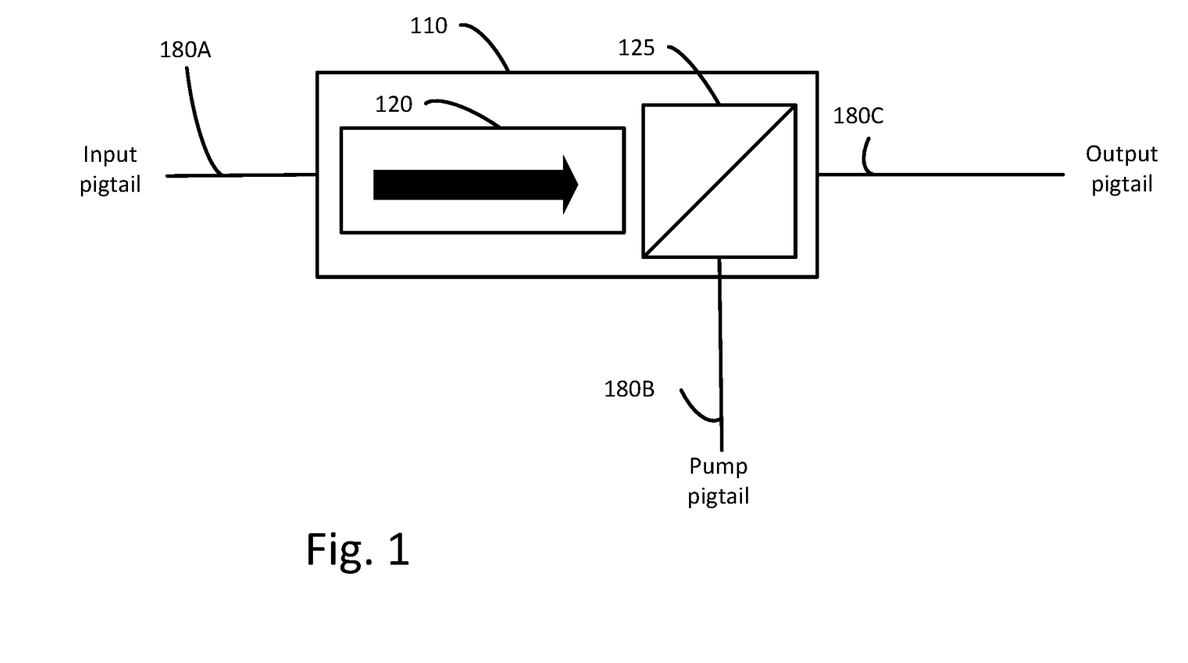
FIG. 1 illustrates a high-level component diagram of an isolator wavelength division multiplexer (IWDM), in accordance with an embodiment of the disclosure.

Refer to the example embodiment of FIG. 1, which illustrates a high-level diagram of an isolator wavelength division multiplexer (IWDM) in accordance with an embodiment of the disclosure. The IWDM 110 includes an input pigtail 180A, isolator core 120, wavelength division multiplexer 125, pump pigtail 180B and output pigtail 180C. The optical signal power to be amplified enters the IWDM 110 via the input pigtail 180A, the pump power used to amplify the input signal enters the IWDM 110 via the pump pigtail 180B. The input signal power and pump power exit the IWDM 110 via the output pigtail 180C. In most embodiments, within an IWDM, cladding diameter, number of modes, and an amount of erbium dopant may be different in all three pigtails from which the IDWM is composed. In various embodiments, varying one or more of the pigtails may improve performance.

Figure 2:
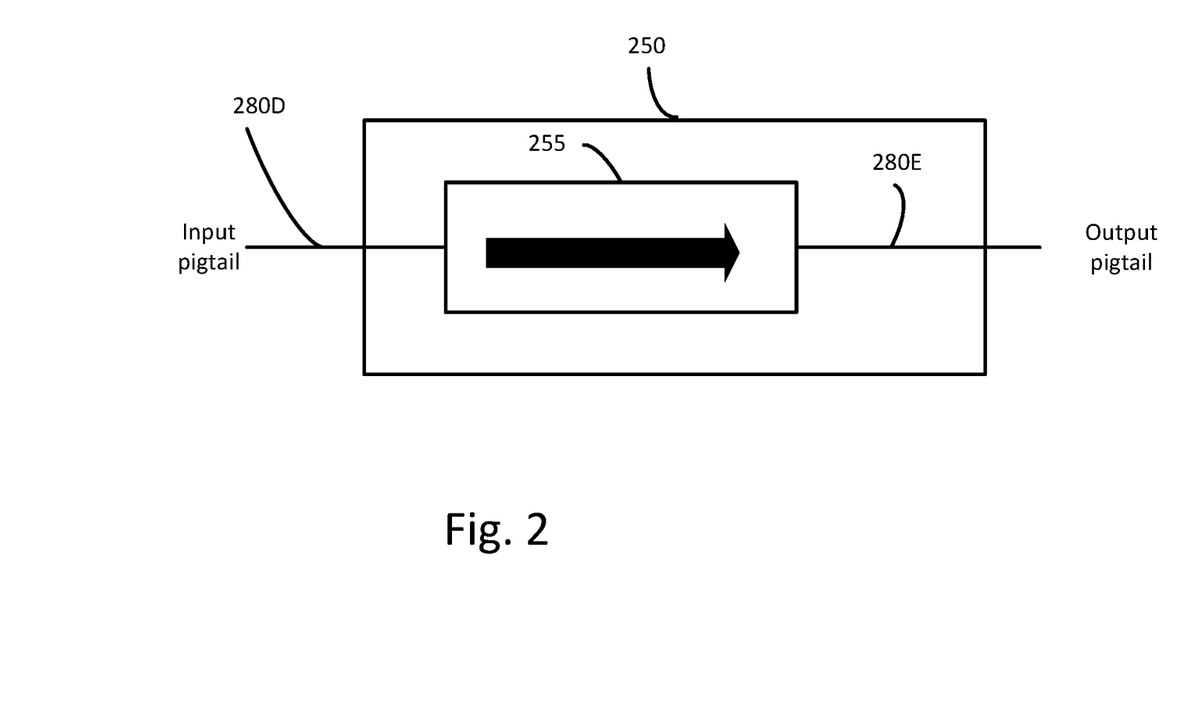
FIG. 2 illustrates a high-level component diagram of an isolator, in accordance with an embodiment of the disclosure.

Referring now to the example embodiment of FIG. 2, which illustrates a high-level diagram of an isolator, in accordance with an embodiment of the disclosure. The isolator 250 includes an input pigtail 280D, isolator core 255, and output pigtail 280E. The optical signal power may enter the isolator 250 via the input pigtail 280D, and the input signal power may exit the isolator 250 via the output pigtail 280E. In most embodiments, within an isolator (e.g., isolator 250), cladding diameter, number of modes, and amount of erbium dopant may be different in both an input and output pigtail from which the isolator may be composed.

Figure 3:
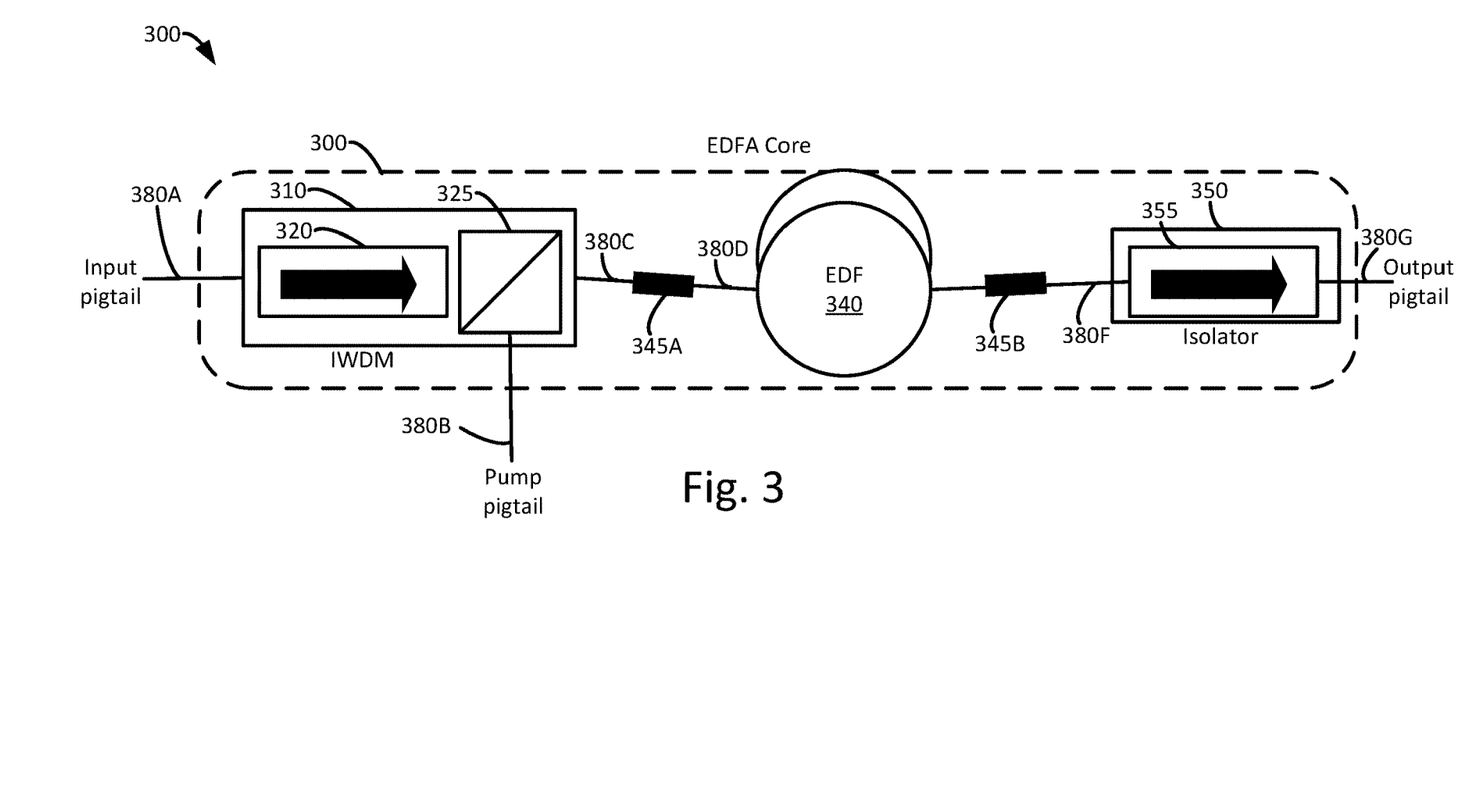
FIG. 3 illustrates a high-level component diagram implementing an erbium doped fiber amplifier (EDFA) core, in accordance with an embodiment of the disclosure.

Referring now to the example embodiment of FIG. 3, which illustrates a high-level component diagram of an erbium doped fiber amplifier (EDFA), in accordance with an embodiment of the disclosure. EDFA 300 includes an isolator wavelength division multiplexer (IWDM) 310, erbium doped fiber (EDF) 340, and an isolator 350. The IWDM 310 includes an isolator 320, wavelength division multiplexer 325, input pigtail 380A, pump pigtail 380B, and output pigtail 380C. The included components are optically connected via pigtail splices 345A and 345B. The signal power enters the EDFA 300 via the input pigtail 380A and exits the EDFA 300 via the output pigtail 380G. The pump power enters the EDFA-core via the pump pigtail 380B. Pigtail 380C and EDF 340 are joined at splice 345A. The EDF 340 and pigtail 380F are joined at splice 345B. Typically, within an EDFA, diameter (e.g., cladding diameter and/or MFD) of optical fiber pigtails of included components (e.g., IWDM 310, EDF 340 and isolator 350) may vary. In most embodiments, a diameter of an EDF (e.g., EDF 340) may be different than a cladding diameter of IWDM output pigtail (e.g., output pigtail 380C) and isolator input pigtail (e.g., input pigtail 380F.) In various embodiments, diameter differences may result in a loss of optical power at each splice (e.g., splice 345A and 345B). Referring to FIG. 3, the pump pigtail 380B passes optical power from a pump (e.g., 980 nm or 1040 nm optical power) via pigtail 380B to the WDM 325. The input signal power and pump power are combined by the wavelength division multiplexer (WDM) 325, inside the IWDM 310, and pass into the IWDM's 310 output pigtail 380C. As shown in FIG. 3, the input signal, and the pump power travel through the IWDM 310 output pigtail 380C into the EDF 340, via splice 345A, where the pump optical power amplifies the input signal power.

In at least one embodiment, within an EDFA core (e.g., EDFA core 300), an IWDM (e.g., IWDM 310) input pigtail (e.g., input pigtail 380A) may include a single mode fiber (SMF) with a 125 µm cladding diameter, to facilitate easy connection to standard optical components that generated the input signal (e.g., laser or photonic circuit); a pump pigtail (e.g., pump pigtail 380B) may be multimode at a pump wavelength to facilitate lower radius bends; and an output pigtail (e.g., output pigtail 380C) may be a SMF at a signal wavelength, and singlemode or multimode at the pump wavelength with an 80 µm cladding diameter to facilitate low loss splicing to the EDF 340 which has an 80 µm cladding diameter at 380D. In certain embodiments, a hybrid IWDM (e.g., hybrid IWDM 310) may ensure that an optimum fiber may be presented at each pigtail connection. In various embodiments, a hybrid IWDM (e.g., hybrid IWDM 310) may result in; improved signal connection to an EDFA core at a pigtail (e.g., pigtail 380A); improved performance at a splice (e.g., splice 345A) (e.g., lower power loss due to core misalignment, and/or lower bend loss, and/or lower cost, and/or improved reliability); and/or reduced signal loss in pigtails (e.g., pigtail 380C) and/or reduced pump power loss in a pump pigtail (e.g., pigtail 380B); and/or less fiber needed to facilitate re-splicing. In certain embodiments, an isolator (e.g., isolator 350) may include an input pigtail (e.g., input pigtail 380F) which may be a SMF with an 80 cladding diameter, to facilitate splicing to an EDF (e.g., EDF 340) which may have a diameter of 80 µm and/or an output pigtail (e.g., pigtail 380G) may have a SMF with a 125 µm cladding diameter, to facilitate connection to standard optical components that receive the amplified input signal. In various embodiments, a configuration including an IWDM (e.g., IWDM 310), an EDF (e.g., EDF 340) and an isolator (e.g., isolator 350) may reduce differences in diameter between the pigtails splices (e.g. splices 345A and 345B), may reduce power loss in pigtails (e.g., pigtails 380B and/or 380C), and may allow low optical power loss connections to an EDFA core (e.g., EDFA core 300) at input and/or output pigtails (e.g., input pigtail 380A and/or output pigtail 380G). The embodiment shown in FIG. 3 may reduce the power loss in, lower the cost of, improve the reliability of, lower the NF of, reduce the amount of fiber used in, and improve the connectivity to, the EDFA core 300.

Figure 4:
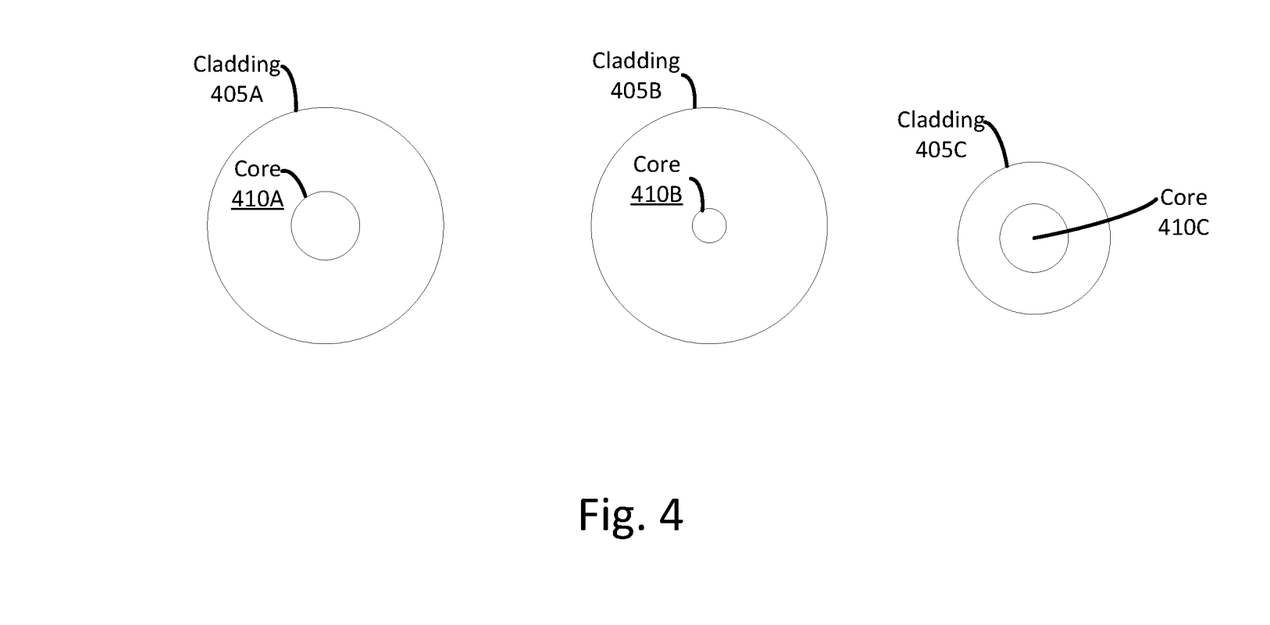
FIG. 4 illustrates cross-section view differences in optical fiber 'pigtails', in accordance with an embodiment of the disclosure.

Referring now to the example embodiments of FIG. 4, which illustrate differences between various types of optical fiber used in pigtails, in accordance with an embodiment of the disclosure. FIG. 4 shows a 125 µm cladding diameter SMF 405A, an alternate 125 µm cladding diameter SMF 405B, and an 80 µm cladding diameter EDF 405C. In comparison, while SMF 405A and SMF 405B have the same cladding diameter, the core 410A of SMF 405A is larger than core 410B of SMF 405B. When comparing EDF 405C with SMF 405A and SMF 405B, the cladding of EDF 405C is noticeably smaller even though the core 410C of EDF 405C is the same size as core 410A of SMF 405A. In various embodiments, when splicing two pigtails (e.g., SMF 405A and EDF 405C), the difference in the cladding diameter of the two fibers and/or core diameter of the two fibers may affect how low-loss and/or reliable a splice may be. In certain embodiments, splicing two pieces of fiber having a same diameter may be easier as the core of each fiber pigtail may already be aligned when the cladding of each fiber pigtail is aligned.

Figure 5A:
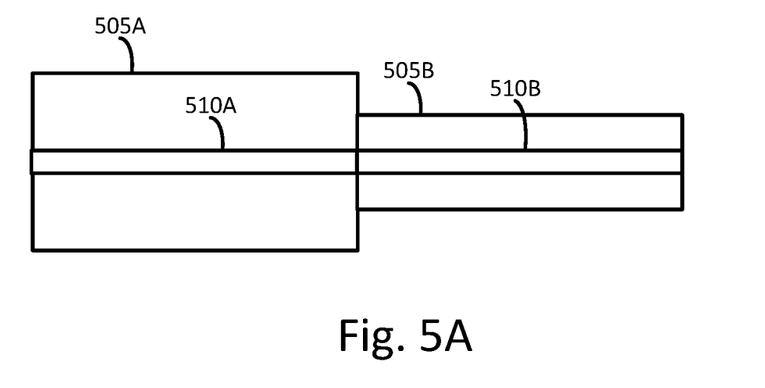
FIGS. 5A, 5B, and 5C illustrate examples of planer view splices between different optical fiber 'pigtails', in accordance with an embodiment of the disclosure.
Figure 5B:
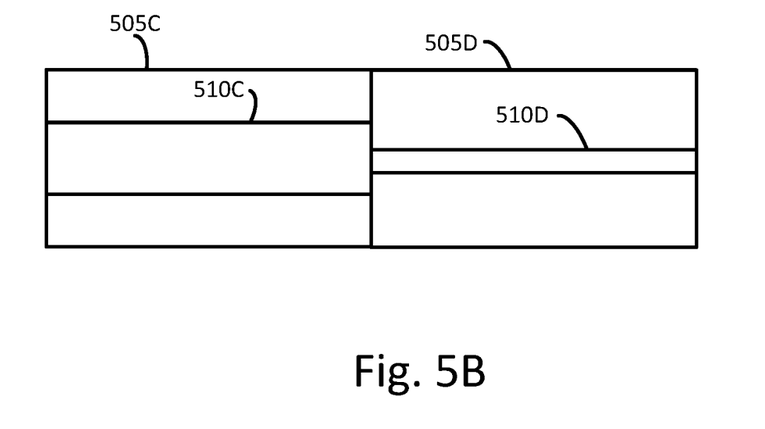
Figure 5C:
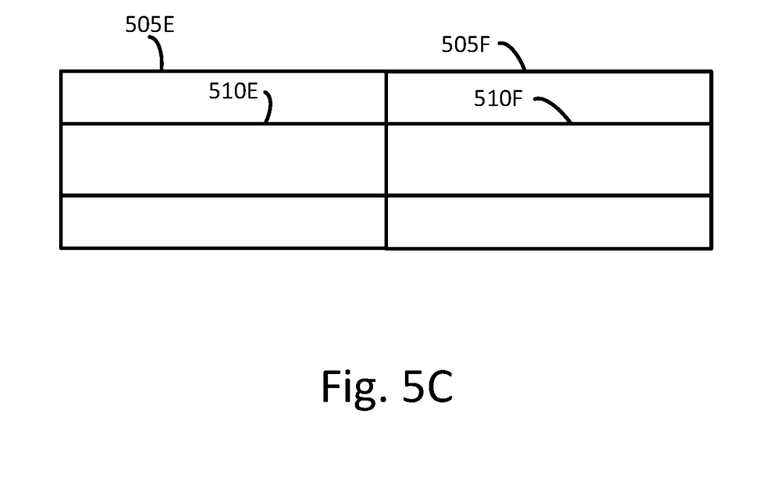

Refer to the example embodiments of FIGS. 5A, 5B, and 5C, which illustrate how various fibers align during a splicing process, in accordance with an embodiment of the disclosure. FIG. 5A shows a 125 µm cladding SMF 505A being spliced with an 80 µm cladding diameter EDF 505B. In this embodiment, core 510A of SMF 505A is the same diameter as core 510B of EDF 505B, however, cladding diameter 505A is larger than cladding diameter 505B making splicing less efficient (e.g., higher power loss, lower reliability and/or lower probability of successful splice.) As shown in FIG. 5B, SMF 505C has the same cladding diameter as SMF 505D, while the core 510C of SMF 505C has a larger diameter than core 510D of SMF 505D, which makes splicing SMF 505C and SMF 505D easier because aligning the cladding of each fiber (i.e., SMF 505C and SMF 505D) automatically aligns each core (i.e., core 510C and core 510D). As shown in FIG. 5C, a 125 µm cladding diameter SMF 505E is spliced to another 125 µm cladding diameter SMF 505F. In this instance, core 510E and core 510F have a matching diameter and core diameter, which makes splicing SMF 505E and SMF 505F easier because aligning the cladding of each fiber (i.e., SMF 505E and SMF 505F) automatically aligns each core (i.e., core 510E and core 510F). In various embodiments, a spliced section with a misaligned core may increase optical power loss and/or reduce the signal strength across the spliced section and/or reduce the reliability of the splice and/or increase the likelihood that a re-splice is needed. In certain embodiments, a spliced section with a misaligned core may require repair and/or may need to be re-spliced.

Figure 6:
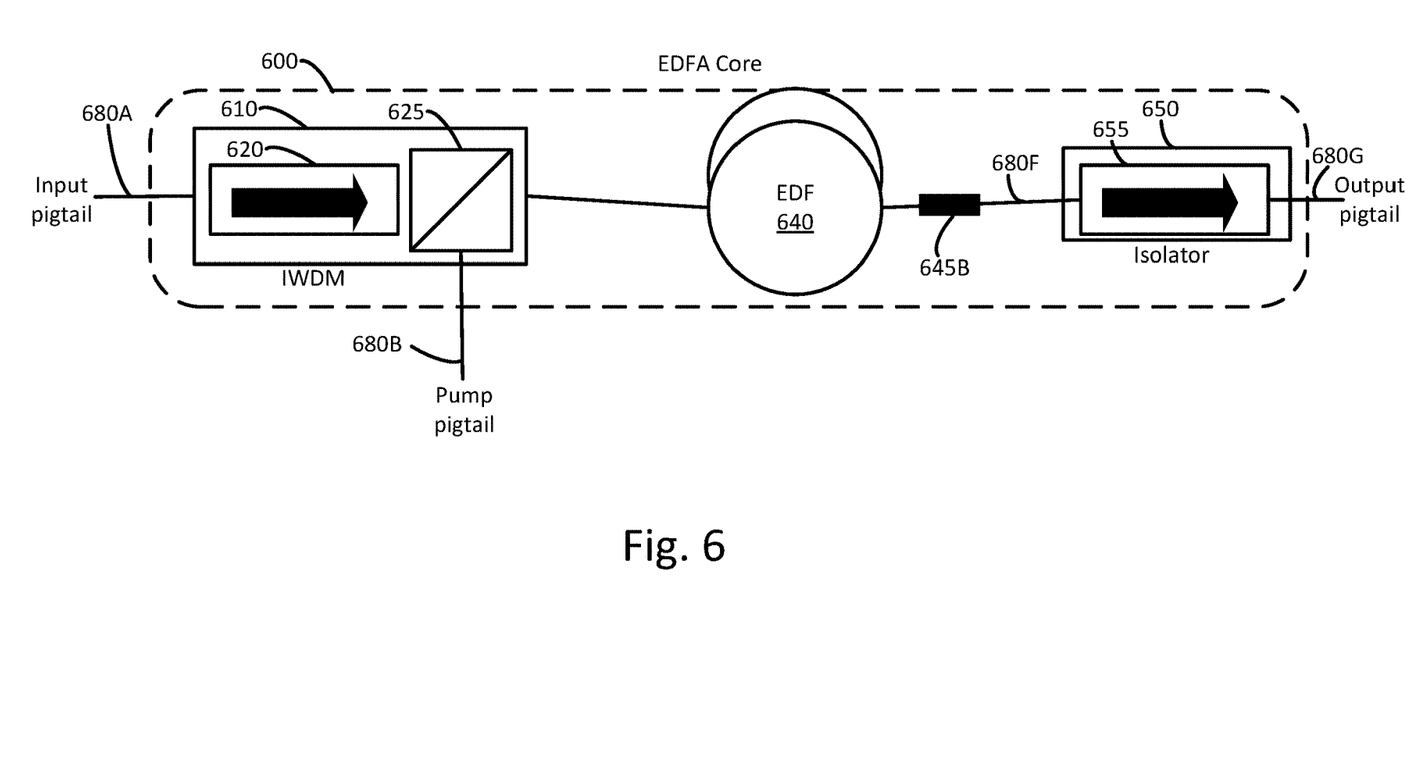
FIG. 6 illustrates a high-level component diagram implementing an erbium doped fiber amplifier (EDFA) core, in accordance with an embodiment of the disclosure.

Referring now to the example embodiment of FIG. 6, which shows a high-level component diagram of an alternate novel configuration of an EDFA core, in accordance with an embodiment of the disclosure. As shown in FIG. 6, EDFA core 600 includes an IWDM 610, EDF 640, and isolator 650. The IWDM 610 includes an input pigtail 680A, isolator core 620, pump pigtail 680B, and WDM 625. In this embodiment, the output pigtail of the IWDM 610 may be connected directly to the EDF 640 and may eliminate a splice and a pigtail. The isolator core 620 substantially prevents any optical power going back to the source of the input signal 680A. The WDM 625 in the IWDM 610 combines the input signal optical power from the input pigtail 680A with the pump optical power from pump pigtail 680B and exits the IWDM via EDF 640. The output of the IWDM 610 is sent directly to the EDF 640 where the pump optical power amplifies the input signal power. The output from the EDF 640 enters the isolator via input pigtail 680F which is spliced to EDF 640 at splice 645B. From the isolator 650 the amplified signal exits the isolator 650 via the output pigtail 680G, which is 125 µm SMF for ease of connection to the components that require the amplified signal. In this embodiment, the input pigtail 680F of isolator 650 is the same fiber as EDF 640 (e.g., input pigtail 680F has the same diameter cladding and same diameter core as the EDF 640)

to facilitate ease of forming splice 645B. When EDFA core 600 is compared to EDFA core (300, FIG. 2), a splice is eliminated (e.g., splice between output pigtail 380C and EDF 340), which reduces a total length of fiber in the EDFA core 600 and eliminates a splice between the EDF 640 and IWDM 610.

Figure 7:
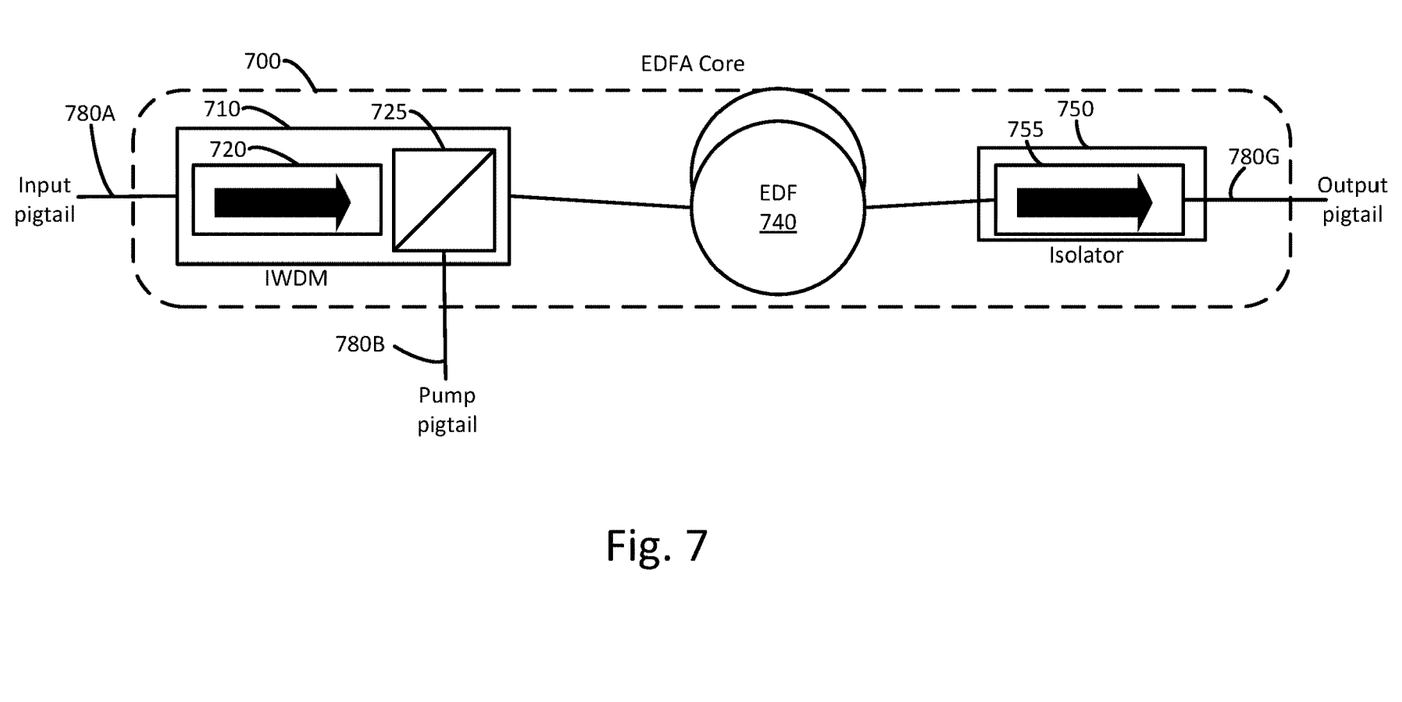
FIG. 7 illustrates a high-level component diagram implementing an erbium doped fiber amplifier (EDFA) core, in accordance with an embodiment of the disclosure.

Referring now to the example embodiment of FIG. 7, which shows a high-level component diagram of an alternate configuration of an EDFA core, in accordance with an embodiment of the disclosure. As shown in FIG. 7, EDFA core 700 includes an IWDM 710, EDF 740, and isolator 750. The IWDM 710 includes an input pigtail 780A, isolator core 720, pump pigtail 780B and WDM 725. The output pigtail of IWDM 710 has been replaced by EDF 740 which also connects directly to isolator 750 as its input pigtail. In this embodiment, the input signal to be amplified is received at input pigtail 780A to the IWDM 710 of the EDFA core 700. The isolator core 720 prevents any optical power going back to the source of the input signal. The WDM 725 in the IWDM 710 multiplexes the input signal optical power from the input pigtail 780A with the pump optical power from pump pigtail 780B and exits the IWDM 710 directly into the EDF 740. The output from the EDF 740 enters the isolator 750 directly as in this case the EDF 740 is the input pigtail to the isolator 750. From the isolator core 755 the amplified signal travels out of the isolator 750 via the output pigtail 780G which is a 125 µm cladding diameter, SMF for ease of connection to the components that require the amplified signal. In this example, two splices are eliminated compared to EDFA core (300, FIG. 3), non-EDF output pigtail of IWDM 710 and non-EDF input pigtail of isolator 750 are eliminated allowing for removal of each splice, and reduces the total length of fiber in the EDFA core.

In various embodiments, an isolator core may allow the use of more than one isolator core within the IWDM to increase the amount of isolation achieved. In certain embodiments, an isolator core may allow the use of more than one isolator core within the isolator to increase an amount of isolation achieved. In some embodiments, an isolator may be replaced by a second IWDM that facilitates the use of a reverse pump configuration where pump power travels in the opposite direction to the signal power. In other embodiments, an IWDM may be replaced by an isolator. In various embodiments, an IWDM function may be implemented using separate components to perform the isolator and WDM functions.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

What is claimed is:

1. A system, comprising:
an erbium doped fiber amplifier (EDFA), comprising:
a length of erbium doped fiber having a first end and a second end;
an isolator wavelength division multiplexer (IWDM) comprising
an input pigtail having a first diameter,
an output pigtail having a second diameter,
a first isolator in optical communication with the input pigtail and
the second end, a wavelength division multiplexer (WDM) in optical communication with the first isolator and the output pigtail, a pump pigtail in optical communication with the WDM, the pump pigtail having a third diameter, the output pigtail optically connected at an optical connection with the first end of the length of erbium doped fiber, wherein the optical connection with the first end of the erbium doped fiber is continuous between the IWDM and the first end of the erbium doped fiber, the input pigtail optically connected at an optical connection with the second end of the erbium doped fiber, wherein two or more of the first diameter, the second diameter, and the third diameter are of different lengths, wherein the optical connection with the first end of the length of erbium doped fiber is a first splice, wherein the optical connection with the second end of the erbium doped fiber is a second splice, wherein the first splice aligns two fibers having substantially the same cladding diameter and substantially the same core diameter.

2. The system of claim 1, wherein the optical connection with the first end of the erbium doped fiber is via an optical fiber optically connected with the IWDM.

3. The system of claim 2, wherein a diameter of the optical fiber and a diameter of the erbium doped fiber is equal.

4. The system of claim 1, wherein the optical connection with the first end of the erbium doped fiber is at the IWDM, wherein the erbium doped fiber is directly connected to the IWDM.

5. The system of claim 1, wherein the optical connection with the second end of the erbium doped fiber is continuous between the second end of the erbium doped fiber and the first isolator.

6. The system of claim 5, wherein the optical connection with the second end of the erbium doped fiber is via an optical fiber optically connected with the first isolator.

7. The system of claim 6, wherein a first diameter of the optical fiber and a second diameter of the erbium doped fiber is equal, wherein the second splice aligns two fibers having substantially the same cladding diameter and substantially the same core diameter.

8. A system, comprising:
a length of optical fiber having a first end and a second end;
a first input pigtail,
an isolator wavelength division multiplexer (IWDM) having an output pigtail, where the IWDM is optically connected to the length of optical fiber via the output pigtail, wherein a cladding of the output pigtail has a first diameter and a cladding of the length of optical fiber has a second diameter, wherein the first diameter and the second diameter are equal, the first input pigtail in optical communication with the IWDM;

an isolator comprising an isolator core, the isolator core optically connected to a second input pigtail, wherein a cladding of the second input pigtail has a third diameter, wherein the third diameter is equal to the second diameter; and a wavelength division multiplexer optically connected to a pump via a pump pigtail and optically connected to the output pigtail, wherein two or more of the first input pigtail, the second input pigtail, the output pigtail, and the pump pigtail comprise different types of optical fiber.

9. The system of claim 8, wherein the length of optical fiber is erbium doped fiber, wherein the erbium doped fiber has a first core, wherein the second input pigtail has a second core, wherein the first core and the second core each have a substantially equal diameter.

10. The system of claim 8, wherein the output pigtail of the IWDM and the length of optical fiber are spliced together.

11. The system of claim 8, further comprising:
an optical pump having an output pigtail; and
wherein the IWDM, having a pump pigtail, is optically connected to the optical pump via the pump pigtail of the IWDM.

12. The system of claim 1, wherein two or more of the input pigtail, the output pigtail, and the pump pigtail each comprise a different type of optical fiber.

13. The system of claim 12, wherein one of the different types of optical fiber is a single mode optical fiber.

14. The system of claim 13, wherein one of the different types of optical fiber is a multimode optical fiber.

15. The system of claim 14, wherein one of the different types of optical fiber is a polarization maintaining optical fiber.

16. The system of claim 1, wherein the first diameter is 125 μm.

17. The system of claim 1, wherein the second diameter is 80 μm.

18. The system of claim 1, wherein the third diameter is 80 μm.

* * * * *